Patented Apr. 22, 1947

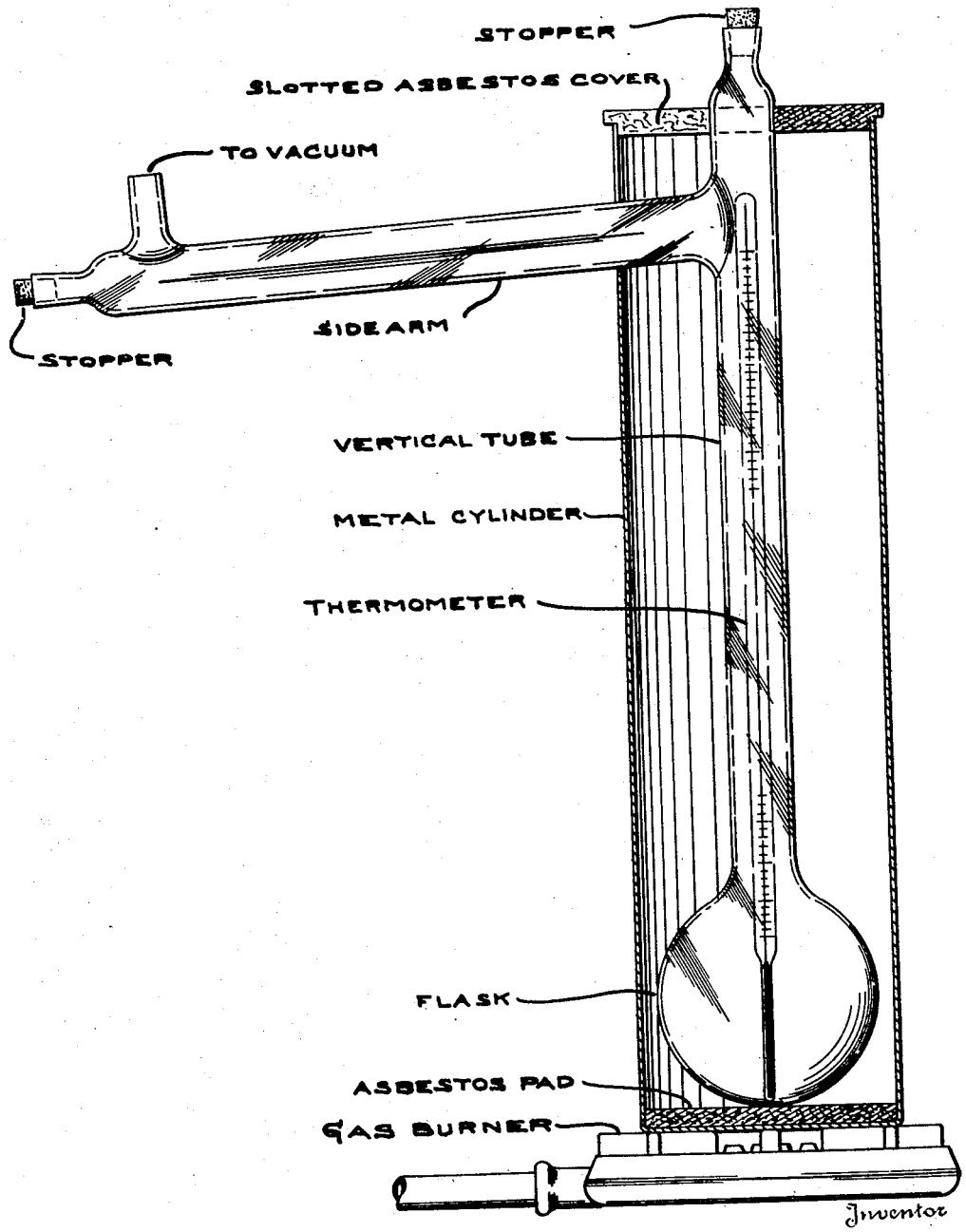

2,419,220

UNITED STATES PATENT OFFICE 2,419,220

DERIVATIVES OF 3-HYDROXY CHOLANIC ACID AND METHODS OF MAKING THEM

Edward C. Kendall, Rochester, Minn., assignor to Research Corporation, New York, N. Y., a corporation of New York Original application November 28, 1941, Serial No. 420,846. Divided and this application November 23, 1942, Serial No. 466,611

7 Claims. (Cl. 260—397.1)

This invention relates to derivatives of 3-hydroxy cholanic acid and methods of making them, and has for its objects the production of new and useful derivatives of 3-hydroxy cholanic acid and the provision of new and effective processes for making such derivatives.

This application is a division of my copending application Serial No. 420,846, filed November 28, 1941, for Adrenal cortex hormones and processes of making the same.

The compounds to which this invention relate are derivatives of 3-hydroxy cholanic acid, which has the formula:

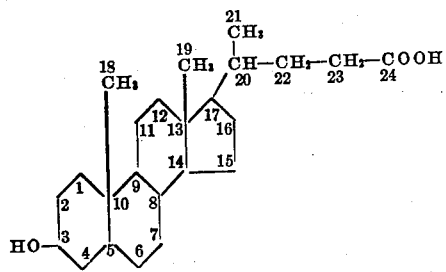

This compound is also known as lithocholic acid.

The group of hormones in the adrenal cortex which have an atom of oxygen on position 11 of the steroid grouping cannot be prepared by any method known at the present time. The high physiological activity of such group of hormones indicates the importance of making them available for use in clinical medicine. The compound 3-hydroxy-11-keto cholanic acid is one that has an oxygen on the 11-position and may be used as an intermediate for the synthetic production of such adrenal cortex hormones. 3-hydroxy-11-keto cholanic acid may be made from 3-hydroxy-Δ-11,12-cholanic acid by a process involving the conversion of the latter compound into 3-hydroxy-11-12-dihalogen cholanic acid.

According to this invention an alkyl ester of the known compound, 3-12-dihydroxy cholanic acid, (also known as desoxycholic acid), is first prepared and from this compound is made the corresponding ester of a 3-acyloxy-12-hydroxy cholanic acid. The latter compound is then converted into the ester of 3-12-di-acyloxy cholanic acid and the 3-12-di-acyloxy compound is saponified whereupon the compound 3-hydroxy-12-acyloxy cholanic acid results. An alkyl ester of this acid is then prepared and this compound is subjected to pyrolysis to form the alkyl ester of 3-hydroxy-Δ-11,12-cholenic acid. The latter compound is converted to the corresponding acid and the acid may be in turn, converted to 3-hydroxy-11-12-di-halogen cholanic acid.

A specific example of the foregoing general process is disclosed in detail hereinbelow. In the following illustration where an ester is involved, the methyl ester is shown, and where an acyloxy compound is involved, benzoxy derivatives are disclosed. Such specific compounds are shown by way of exemplification only, and are not to be construed as limiting the invention.

*Example*

The methyl ester of 3-12-dihydroxy cholanic acid is prepared by treatment of this acid in 7 volumes of methyl alcohol which contains 2 cc. of sulfuric acid for each 100 cc. of alcohol. The mixture is heated to the boiling point for twelve hours. It is necessary to use an ester of 3-12-dihydroxy cholanic acid for the formation of the 3-benzoxy-12-hydroxy derivative of cholanic acid which is desired.

406 grams of the methyl ester of 3-12-dihydroxy cholanic acid are treated (simply mixed together) in benzene with one mole of benzoyl chloride in the presence of 1.2 moles of pyridine. The pyridine hydrochloride formed is removed by filtration from the benzene solution. The methyl ester of 3-benzoxy-12-hydroxy cholanic acid may be separated in crystalline form by removal of all pyridine from the benzene solution with acidulated water, and removal of the benzene in a vacuum. One and a half volumes of ethyl ether are added. Crystals separate which are the methyl ester of 3-benzoxy-12-hydroxy cholanic acid combined with one-half molecule of ethyl ether. M. P. 92°–95° C.

For the preparation of the methyl ester of 3-12-dibenzoxy cholanic acid it is not necessary to crystallize the methyl ester of 3-benzoxy-12-hydroxy cholanic acid but the benzene solution described in the sentence beginning in line 20 above is used. The benzene is removed by distillation in a vacuum, pyridine is added, i. e. the residue is dissolved in about 300 cc. of anhydrous pyridine, and 1.2 moles of benzoylchloride are added. The resulting solution is heated at 100° on a steam bath for at least three hours. Benzene is then added and the pyridine and its hydrochloride are washed from the benzene with acidulated water. The resulting methyl ester of 3-12-dibenzoxy cholanic acid is then recovered by removal of the benzene by distillation in a vacuum and the addition of 500 cc. of 95% ethyl alcohol. The methyl ester of 3-12-dibenzoxy cholanic acid separates in crystalline form. M. P. 143°–144° C.

This compound may also be prepared in a single step as follows: The methyl ester of 3-12-dihydroxy cholanic acid is heated in pyridine with about 120 per cent of the theoretical amount of benzoyl chloride with formation of the dibenzoxy derivative. Free pyridine is removed and the pyridine hydrochloride and excess benzoyl chloride are removed by washing the dibenzoxy cholanic acid methyl ester dissolved in benzene.

This dibenzoxy compound is treated in a convenient volume of ethyl or methyl alcohol with 2.4 moles of sodium hydroxide added as a 5N aqueous solution. The methyl group and the benzoate group at position 3 are removed by heating the resulting solution at boiling temperature for one hour, the 12-benzoxy group remaining unsaponified. The solution is made acid with HCl and the compound 3-hydroxy-12-benzoxy cholanic acid separates in crystalline form as the alcohol is removed in a vacuum. The insoluble acid is thoroughly extracted with boiling hot water in a suitable container. This removes the benzoic acid hydrolyzed from position 3. This compound recrystallized from alcohol diluted with water has a M. P. of 181°–181.5° C. The crystallized material is then esterified with methyl alcohol and sulfuric acid. Most of the alcohol is removed by distillation in a vacuum and the ester is dissolved in benzene and washed with water and sodium bicarbonate solution. The methyl ester of 3-hydroxy-12-benzoxy cholanic acid in benzene solution, so produced, does not crystallize easily therefrom and is used without further purification.

Next, .2 mole of the methyl ester of 3-hydroxy-12-benzoxy cholanic acid is heated in a 300 cc. round bottom Pyrex flask which is fused to a Pyrex tube 38 cm. long and about 25 mm. in diameter, extending vertically from and of the same diameter as the neck of the flask. To the Pyrex tube a side arm 48 cm. long is attached about 28 cm. above the flask body so as to incline downwardly at an angle about 10° from the horizontal. An opening is provided in the upper end of the Pyrex tube attached to the flask for insertion of a thermometer and closed with a rubber stopper, and two openings are made in the side arm at and near the free end thereof. Vacuum (water pump) is applied through the opening near the end of the side arm. A 360° C. thermometer is placed in the flask and rested on the bottom thereof through the opening provided. The opening in the end of the side arm is closed with a rubber stopper. The entire flask and neck are then placed in a metal cylinder about 16 cm. in diameter and 41 cm. deep with the side arm protruding through a slot in the side. The cylinder is heated with a multiple gas flame at such a rate that the temperature, as measured by the thermometer in the flask, is rapidly increased to 315° C.

The above-described apparatus is illustrated in the accompanying drawing, in which the several parts referred to are marked by legends.

Raising the temperature to 315° C. takes about three minutes time. The temperature is then maintained without variation of more than 1 or 2 degrees for 25 minutes. Liberation of benzoic acid produces vigorous agitation of the contents of the flask. The benzoic acid is condensed in the side arm and is prevented from running back into the flask by the angle of the side arm with the Pyrex tube attached to the flask. After 25 minutes, the flask is cooled as rapidly as possible by a current of air. The benzoic acid is dissolved from the side arm with chloroform. The chloroform solution of the benzoic acid is washed with an aqueous solution of sodium bicarbonate and any material not soluble in the bicarbonate solution is added, in its chloroform solution, to the contents of the flask. The contents of the flask are then extracted with chloroform by adding sufficient additional chloroform. The chloroform solution is taken out of the flask and the chloroform removed in a vacuum.

Alcohol is added to the residue and the resulting alcohol solution of the ester is treated with aqueous hydroxide of not more than half normal to hydrolyze the ester. The reaction mixture is heated to boiling on a steam bath to hasten the hydrolysis of the ester. Water is then added to the alcohol solution and the alcohol is removed in a vacuum. The acid is then liberated from its sodium salt by the addition of hydrochloric acid. The solution is cooled and the precipitated acid is ground up with water, well washed and filtered. This precipitate consists of about 55% of the original 3-hydroxy-12-benzoxy cholanic acid and of the 3-hydroxy-$\Delta$-11,12-cholenic acid (about 30% of the mixture) which has been formed, together with from 10 to 15 per cent of acids which have been altered so that they do not crystallize subsequently from benzene.

The crude mixture is dissolved in 1500 cc. of boiling benzene. The solution is cooled and after three hours the 3-hydroxy-12-benzoxy cholanic acid separates almost completely from solution. It is filtered on a suction funnel, washed with benzene, redissolved in 1500 cc. of boiling benzene and recrystallized. The two benzene mother liquors are combined, concentrated to 1000 cc. and treated with an equal volume of aqueous 5% sodium bicarbonate solution. The mixture is heated under a reflux condenser for several hours during which time a precipitate forms in the water layer. This precipitate is the sodium salt of the 3-hydroxy-$\Delta$-11,12-cholenic acid.

The acids which remain in the benzene solution contain a small amount of 3-hydroxy-12-benzoxy cholanic acid. The alkaline solution removes all of the 3-hydroxy-$\Delta$-11,12-cholenic acid from the benzene. Some of the 3-hydroxy-$\Delta$-11,12-cholenic acid does not separate as its sodium salt and can be recovered by precipitation from the aqueous solution by the addition of hydrochloric acid. The precipitated acid is again dissolved in benzene and treated with sodium bicarbonate solution as described above. A further separation of the sodium salt of 3-hydroxy-$\Delta$-11,12-cholenic acid occurs. The two precipitates of the sodium salt of the 3-hydroxy-$\Delta$-11,12-cholenic acid are combined and dissolved in boiling water and the 3-hydroxy-$\Delta$-11,12-cholenic acid is liberated by acidification with HCl. The resulting precipitate of crude 3-hydroxy-$\Delta$-11,12-cholenic acid is well washed with water, dried and dissolved in boiling benzene.

The total yield of 3-hydroxy-$\Delta$-11,12-cholenic acid may be 25% of the starting material. Since 55% of the original 3-hydroxy-12-benzoxy cholanic acid is recovered unchanged, the yield of the 3-hydroxy-$\Delta$-11,12-cholenic acid, based upon the 45% of the starting material which is not recovered, is 55%. The recovered 3-hydroxy-12-benzoxy cholanic acid is re-esterified and retreated by pyrolysis.

Evidence for the correct structure of the 3-hydroxy-$\Delta$-11,12-cholenic acid is afforded by its reduction to 3-hydroxy-cholanic acid. The reduction of the 3-hydroxy-$\Delta$-11,12-cholenic acid is carried out in glacial acetic acid solution with Adam's platinum oxide catalyst at room temperature and atmospheric pressure. One mole of hydrogen is rapidly absorbed. The platinum is filtered from solution and the 3-hydroxy-cholenic acid is crystallized from the glacial acetic acid. The yield is practically quantitative. This process proves the integrity of the molecule of the 3-hydroxy-$\Delta$-11,12-cholenic acid and that no rearrangement has occurred from the original structure other than the formation of the double bond between positions 11 and 12.

Bromine readily adds to the double bond of 3-hydroxy-Δ-11,12-cholenic acid with the formation of the dibromo derivative, as is evidenced by the following example:

0.004 M (1.496 g.) of 3-hydroxy-Δ-11,12-cholenic acid are dissolved in 20 cc. of chloroform plus 5 cc. of glacial acetic acid. The solution is cooled in an ice bath to 0° C. It is then poured into chloroform at 0° C. which contains 10% excess of the theoretical amount of bromine required and is allowed to stand ten minutes at 0° C. The resulting chloroform solution is made up to about 50 cc. total volume with chloroform and then washed with water which contains sodium bisulfite in quantity just sufficient to reduce the excess of bromine. It is then washed with sodium bicarbonate solution to remove all mineral and acetic acid. The chloroform is then removed in a vacuum and the residue taken up with methyl alcohol. The last traces of chloroform are then removed by partial evaporation of the alcohol solution in a vacuum. The 3-hydroxy-11-12-dibromo cholanic acid crystallized from the methyl alcohol on standing. Yield 80%. M. P. 172°–173° C.

The above described series of reactions by which 3-12-dihydroxy cholanic acid is converted to 3-hydroxy-Δ-11,12-cholenic acid may be applied to derivatives of cholanic acid in which the 17-position contains various substituents other than the

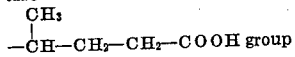 group

For example, the 17-position may be occupied by a simple carboxyl group, an hydroxy group, a ketone group, a carboxy group attached at the end of a hydrocarbon chain of a smaller number of carbon atoms such as one or two, an amide group (—CONH₂), an alkyl chain bearing an amide group at its free end, a simple alkyl group, an alkyl group having any terminal atom or group other than a free carboxyl group. In other words, the 17-position may contain any atom or group which will not form an ester with the OH group in the 3-position of another similar molecule.

The process can be carried through also with derivatives of 3-12-dihydroxy cholanic acid or of the above-described derivatives of cholanic acid containing other groups in the 17-position in which the hydrogens in the 6- and 7-positions of the steroid nucleus are substituted by monovalent substituents. Thus, the invention embraces generally the formation of a double bond between the 11- and 12-carbon atoms in a steroid compound through pyrolysis of such a compound in which the OH group in position 3 is free or unesterified, while the OH in position 12 is esterified and any carboxyl group attached to the 17-position is esterified.

The transformations from 3-12-dihydroxy cholanic acid to the 3-hydroxy-Δ-11,12-cholenic acid described above are depicted by the following structural formulae:

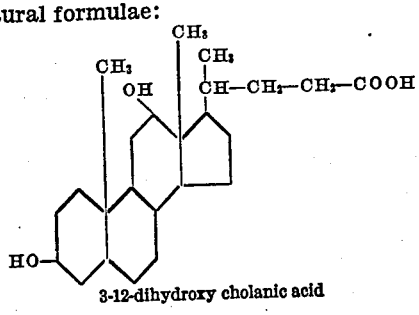
3-12-dihydroxy cholanic acid

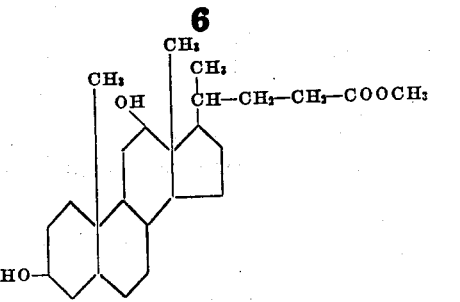
Methyl ester of 3-12-dihydroxy cholanic acid

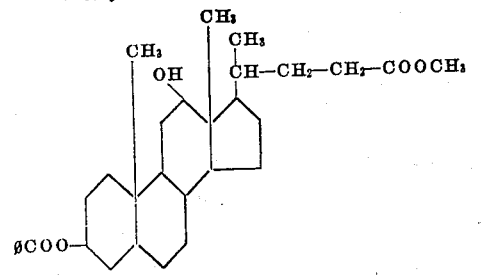
Methyl ester of 3-benzoxy-12-hydroxy cholanic acid (symbol ∅ stands for the phenyl group)

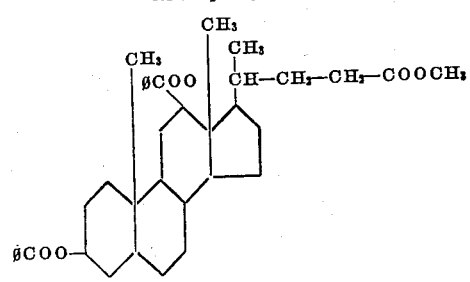
Methyl ester of 3-12-dibenzoxy cholanic acid

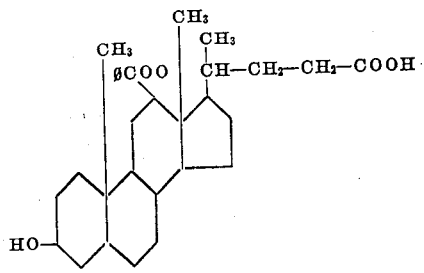
3-hydroxy-12-benzoxy cholanic acid

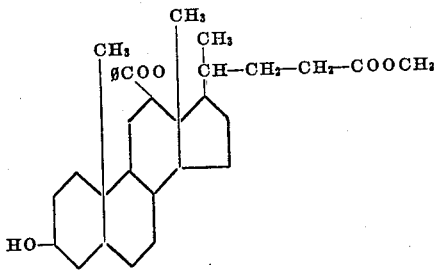
Methyl ester of 3-hydroxy-12-benzoxy cholanic acid

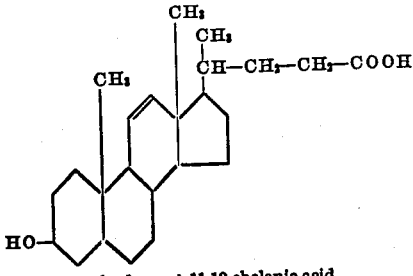
3-hydroxy-Δ-11,12-cholanic acid

The dibromo compound produced from 3-hydroxy-Δ-11-12-cholanic acid has the formula:

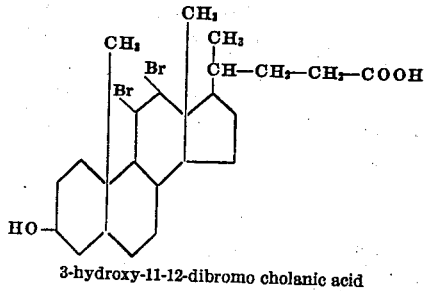

3-hydroxy-11-12-dibromo cholanic acid

What is claimed is:

1. The process which comprises subjecting to pyrolysis the methyl ester of the carboxyl group of 3-hydroxy-12-benzoxy-cholanic acid.

2. The process which comprises heating the methyl ester of 3-hydroxy-12-benzoxy cholanic acid at a temperature of about 315° C. for about 25 minutes, thereby forming 3-hydroxy-Δ-11,12-cholenic acid.

3. The process which comprises esterifying 3-12-dihydroxy cholanic acid into its methyl ester, acylating the latter into its 3-benzoxy derivative, acylating said 3-benzoxy derivative into its 3-12-dibenzoxy derivative, saponifying the 3-12-dibenzoxy derivative to the corresponding 3-hydroxy-12-benzoxy acid, re-esterifying the carboxyl group, splitting off benzoic acid from the 12-position by pyrolysis with the formation of a double bond between the 11- and 12-carbon atoms, and saponifying the resulting compound to the free acid.

4. A compound of the group consisting of 3-hydroxy-Δ-11,12-cholenic acid and alkyl and aryl esters of the carboxyl group thereof.

5. The compound 3-hydroxy-Δ-11,12-cholenic acid.

6. Lower alkyl esters of the carboxyl group of 3-hydroxy-Δ-11,12-cholenic acid.

7. 3-hydroxy-Δ-11,12-cholenic acid methyl ester.

EDWARD C. KENDALL.

REFERENCES CITED

The following references are of record in the file of this patent:

Wieland, "Zeit. Physical Chem.," vol. 210, pages 268–81.